Nov. 24, 1925.
H. MORRIS ET AL
1,562,908
DEVICE FOR ATTACHING CHAINS TO LIFTING GEAR HOOKS AND THE LIKE
Filed April 17, 1924
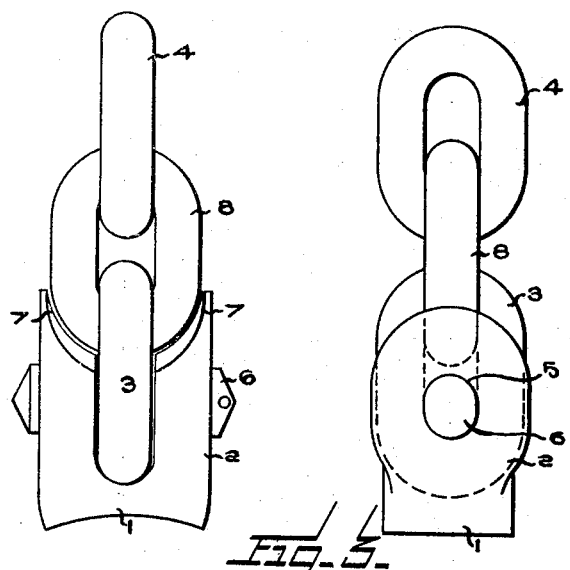
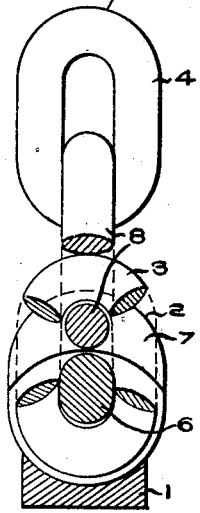
INVENTORS
H. MORRIS.
J.A.BUTTERWORTH.
By Fetherstonhaugh & Co
ATTYS.

Patented Nov. 24, 1925.

1,562,908

UNITED STATES PATENT OFFICE.

HERBERT MORRIS AND JOSEPH ALEXANDER BUTTERWORTH, OF LOUGHBOROUGH, ENGLAND, ASSIGNORS TO HERBERT MORRIS INCORPORATED, OF BUFFALO, NEW YORK, A CORPORATION OF NEW YORK.

DEVICE FOR ATTACHING CHAINS TO LIFTING GEAR HOOKS AND THE LIKE.

Application filed April 17, 1924. Serial No. 707,311.

*To all whom it may concern:*

Be it known that we, HERBERT MORRIS and JOSEPH ALEXANDER BUTTERWORTH, both subjects of the King of Great Britain, and both of Empress Works, Loughborough, Leicestershire, England, have invented certain new and useful Improvements in Devices for Attaching Chains to Lifting Gear Hooks and the like, of which the following is the specification.

Our invention relates to improvements in devices for attaching chains to lifting gear hooks and the like and the object of the invention is to provide an improved attachment for connecting the chain to the lifting hook or other lifting gear accessory which will dispense with the usual forged link now in use for connecting the ordinary form of eye hook or the like to the chain.

Our invention consists of a device constructed and arranged all as hereinafter more particularly described and illustrated in the accompanying drawing in which:

Fig. 1 represents an elevational view of our device showing the same attached to a chain.

Fig. 2 is an elevational view taken at right angles to Figure 1, and

Fig. 3 is a vertical cross section showing the end link of the chain and the next link in part, broken away.

Like characters of reference indicate corresponding parts in the different views.

1 is a member provided with a bifurcated end 2 formed integrally therewith, the integral projections of the end being so spaced apart as to accommodate snugly between them the end link 3 of the chain 4. The projecting portions of the bifurcated end 2 are provided with holes 5 preferably of oval shape and adapted to receive the oval cross pin 6 inserted therethrough and through the end link 3 of the chain, such pin holding the link in position.

The adjacent faces 7 of the projecting portions of the bifurcated end 2 are so curved as to conform closely to the curvature of the bottom portion of the link 8 in order to permit such link to swing in either direction.

While we have illustrated the device with the bifurcated end extending upwardly, as would be the case where our device is to be applied to top hooks, it is to be understood that the device can be used in any position and on any lifting gear part or accessory to which it is desired to connect a chain. In addition to being used for hooks generally our device is particularly applicable to top and swivel hooks, thrust plates, cross stays and top yokes used in connection with lifting gear.

From the above description it will be apparent that we have devised a simple and effective device for connecting chains to parts and accessories used in lifting gear, which will do away with the ordinary forged link now used with an eye hook or eyes on such parts or accessories.

What we claim as our invention is:—

1. In a device of the character described, the combination with the end link of a chain, of a bifurcated member straddling such end link, the adjacent faces of the projecting portions of the bifurcated member being curved to correspond with the curvature of the link of the chain next the end link, and means for holding the end link in position between the projecting portions of the bifurcated member.

2. A device of the character described comprising a bifurcated member formed with a curved seat located between and at the lower extremities of the branches of the bifurcation, the upper free extremities of said branches being curved at the inner side to conjointly provide a second seat extending in a direction at right angles to the first mentioned seat, and means for holding the end link of a chain to the first mentioned seat with the next link of the chain engaging the second mentioned seat.

HERBERT MORRIS.
JOSEPH ALEXANDER BUTTERWORTH.